United States Patent [19]

Nelson et al.

[11] 3,861,511

[45] Jan. 21, 1975

[54] ROTATIONAL SHAFT COUPLING APPARATUS WITH ADJUSTABLE COUPLING RATIO AND POSITIVE DISPLACEMENT

[75] Inventors: Carl R. Nelson; Robert V. Hery, both of Derby, Kans.; Joseph V. Baum, Columbus, Ohio

[73] Assignee: NCR Corporation, Dayton, Ohio

[22] Filed: Mar. 7, 1973

[21] Appl. No.: 338,656

[52] U.S. Cl. .................................. 197/16, 197/52
[51] Int. Cl. .......................................... B41j 23/02
[58] Field of Search ............ 197/16, 18, 19, 20, 52, 197/55, 53, 82

[56] References Cited
UNITED STATES PATENTS

| 3,224,546 | 12/1965 | O'Daniel et al. | 197/16 |
| 3,352,398 | 11/1967 | Crutcher et al. | 197/16 |
| 3,419,124 | 12/1968 | Sawakl | 197/18 X |
| 3,516,528 | 6/1970 | Davidge et al. | 197/16 |
| 3,581,860 | 6/1971 | Schaefer | 197/16 X |
| 3,724,630 | 4/1973 | Manson | 197/16 X |

Primary Examiner—Robert E. Pulfrey
Assistant Examiner—R. T. Rader
Attorney, Agent, or Firm—J. T. Cavender; Albert L. Sessler, Jr.; Elmer Wargo

[57] ABSTRACT

A plurality of flexible tension members couple the limited rotational movement of a first shaft member to one or more additional shaft members according to an adjustable infinite resolution coupling ratio and with the use of positive displacement coupling. Plural embodiments of the invention are disclosed including one wherein the coupling apparatus provides precise adjustment of the coupling ratio between a spherical printing ball mounting shaft and the ball rotating energy source.

12 Claims, 5 Drawing Figures

ROTATIONAL SHAFT COUPLING APPARATUS WITH ADJUSTABLE COUPLING RATIO AND POSITIVE DISPLACEMENT

BACKGROUND OF THE INVENTION

Mechanical apparatus requiring the use of variable ratio coupling between two rotational shaft members is normally limited to the use of geared couplings or some form of nonpositive displacement apparatus such as a hydraulic drive or a friction drive of the belt or friction disc type. While all of these arrangements provide a variable coupling ratio, each is found to incorporate one or more limitations. The geared drive is limited to predetermined increments of coupling ratio and is therefore unable to provide the large or infinite number of coupling ratio variations needed in many applications. Hydraulic devices are well known to be large in size, of relatively short operating life because of leakage and component wear, and of otherwise general unsuitability for many coupling applications. In the friction drive, the disadvantages of high energy loss, nonprecisely determined coupling ratio, component wear and limited life are to be found.

In one field of use of variable ratio coupling devices, the typewriter and serial printer portions of the business machine art, it has become common practice to employ a spherical or golf ball-like member embossed with character symbols as the printing element. In machines of this type, the spherical ball is mounted with three modes of mechanical freedom (rotate, tilt, lateral position) and is driven by one or more sources of mechanical energy in these three modes to predetermined positions where individual printing operations are performed. Since the "ball tilt" and "ball rotate" movements in these machines must be independent of the "ball lateral" position, serial printers of this type commonly employ one or more ball-carriage-to-printer-frame coupling apparatus which include differentially threaded flexible tension members such as metal bands or braided cables and a pair of intermediate control arm coupling members, and which provide for free lengthwise passage of the flexible tension members but retention of a fixed ball position during lateral movement of the ball carriage. The intermediate control arm coupling members are driven differentially and impart differential movement to the flexible tension members in achieving the ball rotate or ball tilt motions in these machines.

The use of flexible tension member ball-carriage-to-frame coupling apparatus in these machines is highly desirable since it avoids the slow response and high energy dissipations which would result if a stepping motor or other energy transducer used for producing the rotate and tilt movement were mounted on a laterally movable ball carriage along with the printing ball.

When machines employing flexible tension member coupling apparatus utilize a stepping motor or a mechanical adder or other forms of non-closed-loop prime mover device to supply rotational energy for the printing ball, there occurs a difficulty in assuring that a given rotational increment at the prime mover terminus of the flexible tension member coupling apparatus is reproduced as the same increment of rotation (or some predetermined multiple thereof) at the printing ball terminus of this coupling apparatus. In practice, for instance, it is found that very small errors in the diameter of the prime mover drumshaft or the printing ball drum shaft cause these members to reel out or collect an improper length of the flexible tension member. In practice it is also found that small errors in the thickness of the flexible tension member or in the length of lever arms in the intermediate members can alter the coupling ratio between prime mover shaft and printing ball shaft. The influence of flexible tension member thickness on coupling ratio is an especially troublesome occurrence since tension member thickness is subject to change with accumulated use of the machine.

Error in the coupling ratio between prime mover shaft and printing ball rotation shaft has the effect in typewriter and serial printer machines of locating the printing ball in rotational positions which are increasingly misregistered or displaced from the desired position as the ball is displaced from a neutral or mechanism set-up character position since the misregistration present for each character adds to that of the adjacent character and therefore accumulates to a maximum error at the character farthest removed from the neutral or mechanism set-up character. Misregistration error in the printing ball tilt coupling system, though inevitably present in these machines, is not so critical a problem as is rotational misregistration, since the ball tilting motion involves only a few degrees of shaft rotation in contrast with the substantially 360° rotation normally employed for ball rotation.

Because of the accumulative ball rotation error, and the unavailability of a positive displacement variable coupling ratio mechanism in the mechanical arts, it has become common practice in the design of spherical ball typewriter and printer machines to require that mechanical parts having very close dimensional tolerances be used in the critical locations of the ball rotation coupling apparatus. These parts are of course inherently expensive to manufacture and maintain.

DESCRIPTION OF THE PRIOR ART

Earlier issued patents contain several examples of the spherical ball printing mechanisms. These patents also include improvements which relate to eliminating printing head position errors. The following examples of these prior art patents are believed most closely related to the present invention.

In U.S. Pat. No. 2,919,002 issued to L. E. Palmer of IBM Corporation on Dec. 29, 1959, there is shown a printing head rotational positioning apparatus of the flexible tension member and moving control arm member type. Although the Palmer patent relates to the spherical ball printer, it does not disclose apparatus capable of correcting for accumulative ball position error.

In a series of United States patents issued to IBM Corporation in the names of G. A. Walker, R. F. Hanft, J. B. O'Daniel and several other inventors, and including U.S. Pat. Nos. 2,989,166; 3,133,620; 3,224,545; and 3,224,546, there is disclosed an apparatus capable of overcoming the type of print head rotation error which results from parts wear and dimensions change in the head positioning apparatus during prolonged usage. These patents are concerned with wear-induced changes and provide compensation for the error resulting from these changes with an intermittent motion mechanism which senses accumulated error during selected movements of the printer mechanism and then moves a compensating member to accommodate this error. The present invention apparatus is distinguished from the IBM patents by its nature of being an initial set-up error-compensating apparatus and by differences in the mechanism structure.

In U.S. Pat. No. 3,493,090 issued to G. N. Liles of Burroughs Corporation, there is described a printer ball positioning apparatus which employs flexible tension members and one intermediate control arm member for rotationally positioning the printer ball. In the Liles apparatus, the flexible tension member is threaded around fixed position pulley members located at opposite ends of the ball carriage lateral movement path, and the flexible tension members are terminated at points located on the ball carriage. Both of these structural features distinguish the Liles apparatus from that of the present invention and prevent the introduction of rotational position error correcting feedback signals as is accomplished in the present invention.

BRIEF SUMMARY OF INVENTION

This invention concerns a variable coupling ratio mechanical apparatus which incorporates a driven flexible tension member having one lengthwise portion threaded around a first part of a rotatable lever arm member and a second lengthwise portion anchored to a different part of the same lever arm member. Location of the second lengthwise portion anchor point can be made continuously adjustable over at least a small range to provide high resolution stepless adjustment of the lever arm member rotational throw and of the mechanical coupling ratio of the apparatus.

DETAILED DESCRIPTION OF INVENTION

Figures 1, 2:
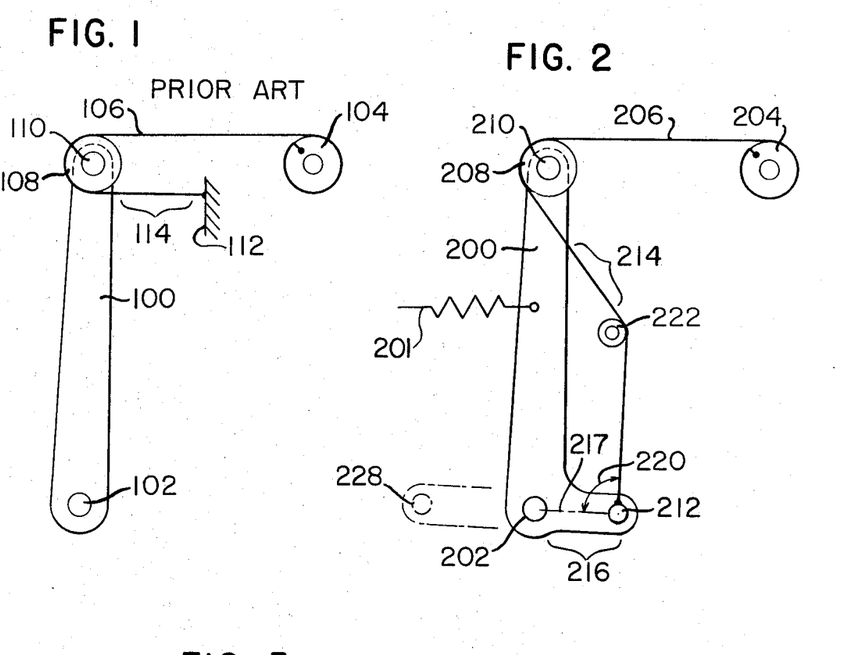
FIG. 1 of the drawings shows the prior art arrangement for driving a rotatable lever arm member from an input shaft with a flexible tension member.
FIG. 2 of the drawings shows in schematic form a partial embodiment of a coupling apparatus made in accordance with the present invention.

Most elements of the FIG. 1 prior art apparatus are employed in embodying the present invention; this FIG. 1 apparatus includes a lever arm member 100 fastened to a rotatable output shaft 102 and a flexible tension member 106 which engages a rotatably driven input shaft member or cable drum 104. The flexible tension member 106 is anchored to an immovable frame portion 112 of the machine and engages a pulley or sheave 108. The pulley or sheave 108 is rotatably attached to the lever arm member 100 by suitable means such as a shaft 110. The rotatable shaft member 104 is driven by a source of rotational energy such as a motor, a stepping motor, or in the case of some serial printer embodiments, a mechanical adder mechanism. In FIG. 1 and the other drawings, the flexible tension member 106 is shown as being wrapped around the rotatable shaft member 104 and anchored thereto in the manner used with a windlass or cable drum apparatus. Other forms of engagement between the flexible tension member 106 and the shaft member 104, including a chain and sprocket or a timing belt and pulley, are possible. The flexible tension members 106 in FIG. 1, 206 in FIG. 2, and 306 in FIG. 3 can be fabricated from one of several available materials including braided steel, bronze cable and the above mentioned chain or timing belt structures. Alternatively, a thin band-like structure having a generally rectangular cross-sectional shape can be employed for this service.

In the coupling apparatus of FIG. 1, the lever arm 100 moves in a clockwise rotational direction in response to a clockwise rotation of the shaft member 104. Return rotation of the lever arm 100 in the counterclockwise direction is provided by means such as a return spring or additional flexible tension members which are not shown in FIG. 1.

Figure 3:
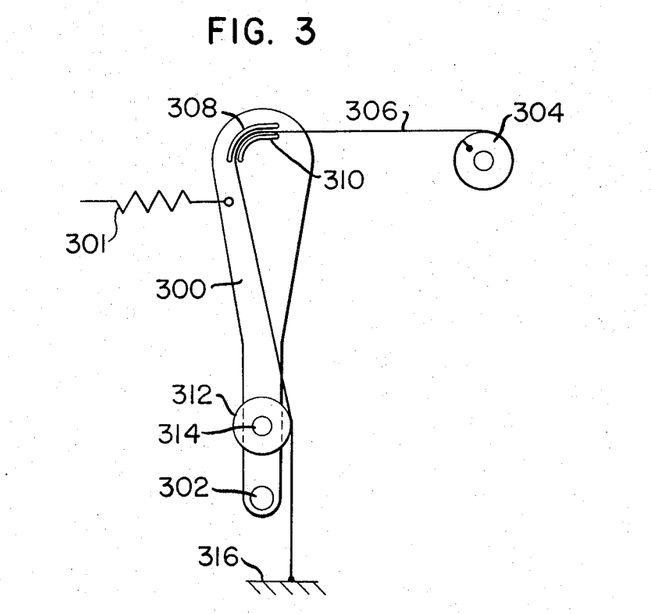
FIG. 3 of the drawings shows in schematic form a partial embodiment of a second coupling apparatus made in accordance with the present invention.

When the shaft member 104 is driven in the clockwise direction in FIG. 1, the flexible tension member 106 is wound onto its periphery and is thereby withdrawn lengthwise from the region 114 beyond pulley member 108 to produce clockwise motion of the lever arm 100. Lengthwise movement of the flexible tension member 106 past the pulley 108 and the shaft 110 is permitted by the rotational mounting of the pulley 108 on said shaft or may alternatively be provided by a linearly sliding bearing structure wherein the flexible tension member 106 slides lengthwise over a low friction material of the type known in the art. A linearly sliding bearing structure is illustrated in FIG. 3 of the drawings.

In precision mechanisms employing the FIG. 1 coupling apparatus, there is need for closely controlling the coupling ratio between the input shaft member 104 and the output shaft 102. In such mechanisms it is necessary that the angle through which the output shaft 102 rotates in response to a specified driven angular rotation of the input shaft 104 be precisely in accordance with a predetermined mathematical expression. This coupling ratio between the input shaft member 104 and the output shaft 102 is determined primarily by the ratio of length of the lever arm 100 and radius of the shaft member 104, with factors such as diameter of the pulley 108, thickness of the flexible tension member 106 and angular displacement of the lever arm 100 from the vertical position being important to a lesser extent.

In the usual application of the FIG. 1 apparatus, an attempt is made to achieve a predetermined coupling ratio between shaft members 102 and 104 by assigning theoretically determined dimensions to each critical element of the apparatus. Where the coupling ratio is especially critical, resort may be had to trial and error or laboratory procedures for establishing at least one of these critical dimensions, thereby precisely "tuning" the coupling ratio to the desired value. One of the major problems encountered with the FIG. 1 apparatus is that it provides no convenient manner for accomplishing this tuning or adjusting of coupling ratio. Where it is imperative that such adjustment be provided, it has been common practice to include a slot in the lever arm 100 for allowing the pulley 108 to be moved in position or to provide for the adjustable variation of some other critical dimension in the apparatus.

Since normal usage can also induce change in the dimensions of some elements of the FIG. 1 apparatus, including for instance the thickness of flexible tension member 106, and the diameter of input shaft member 104, it is desirable to provide, in an improved coupling apparatus, some means for quickly and conveniently changing the coupling ratio after the mechanism is placed in service.

In the coupling apparatus of FIG. 2, a convenient, fast and positive means for adjusting shaft coupling ratios and for thereby achieving a predetermined coupling ratio between two shaft members is illustrated. The apparatus of FIG. 2 includes input and output shaft members 202 and 204, respectively, a lever arm member 200, a pulley member 208 and a flexible tension member 206 which are all in accordance with the similarly designated parts shown in FIG. 1. As was true in FIG. 1, the FIG. 2 apparatus provides only for clockwise rotation of the lever arm member 200, with counterclockwise rotation being provided by spring return means or other apparatus shown as a spring 201 in FIG. 2.

The arrangement and operation of the FIG. 2 apparatus is similar to that of the FIG. 1 apparatus with the exception that flexible tension member 206 in FIG. 2 is no longer connected to a fixed anchor point as was the case at 112 in FIG. 1, but in FIG. 2 is returned to an anchor point 212 located on a portion of the lever arm member 200. The FIG. 2 apparatus also includes a guide member 222 which alters the threading path of the flexible tension member 206 between the pulley member 208 and the anchor point 212. This guide member 222 may consist of a fixed center second pulley member or a fixed sliding friction member depending upon the ultimate usage of the FIG. 2 apparatus.

The notable difference between operation of the FIG. 2 apparatus and operation of the FIG. 1 apparatus lies in the fact that coincidentally with the shaft member 204 reeling in the flexible tension member 206 from the region 214 beyond the pulley member 208, in FIG. 2, the anchor point 212 moves in a clockwise direction around the shaft 202, and also withdraws part of the flexible tension member from the region 214. In other words, by adding the movable anchor point 212 to the FIG. 2 apparatus, the movement produced at the output shaft 202 by a given rotational increment of the input shaft 204 has been increased.

The effectiveness of the movable anchor point 212 in withdrawing flexible tension member from the region 214, and moreover the ability of the movable anchor point structure in changing the coupling ratio between shafts 204 and 202, is dependent upon the distance 216 between the axis of rotation of the lever arm 200 and the movable anchor point 212. Increasing the distance 216 between axis of rotation of the lever arm 200 and anchor point 212 increases the influence of the movable anchor point structure on the coupling ratio, while decreasing the distance reduces the ability of the movable anchor point structure to influence the coupling ratio. In some embodiments of the FIG. 2 apparatus it may be convenient to make location of the movable anchor point 212 adjustable so that the distance between movable anchor point and axis of rotation can be altered as desired.

Regardless of the distance at 216 between the axis of rotation of lever arm 200 and the movable anchor point 212, the effectiveness of the movable anchor point in changing the coupling ratio between shafts 204 and 202 is dependent upon the angle at 220 between the flexible tension member and the radial line connecting the axis of rotation with the movable anchor point. When the angle at 220 is near 90° as is illustrated in FIG. 2, the movable anchor point has a maximum influence on the shaft to shaft coupling ratio. As the angle at 220 is increased or decreased in size by rotational movement of the movable anchor point, the effectiveness of the movable anchor point is gradually diminished until, when the angle at 220 is either 0° or 180°, incremental rotation of the anchor point has negligible influence upon the coupling ratio between shafts 204 and 202.

Although an angle of nearly 90° at 220 in FIG. 2 provides a movable anchor point with the greatest effectiveness in changing coupling ratio between the shafts 204 and 202, angles other than 90° may be employed at 220 while yet realizing the benefits of an altered coupling ratio between the shafts 204 and 202. Altering of the coupling ratio will occur so long as the angle at 220 is not as small as 0° or as large as 180°. (In other words, so long as the flexible tension member does not approach the movable anchor point 212 along an alignment coincident with that of an extended radius vector originating at the axis of rotation of lever arm 200, the movable anchor point will be effective in altering the shaft coupling ratio.)

In FIG. 2, the guide member 222 serves to align the flexible tension member 206 into a path forming an angle of substantially 90° at 220. For most applications of the coupling apparatus, the incorporation of a guide member such as 222 is desirable in order that the flexible tension member approach the movable anchor point with an angle of nearly 90° and thereby in order that maximum effectiveness of the movable anchor point be realized.

Figures 4, 5:
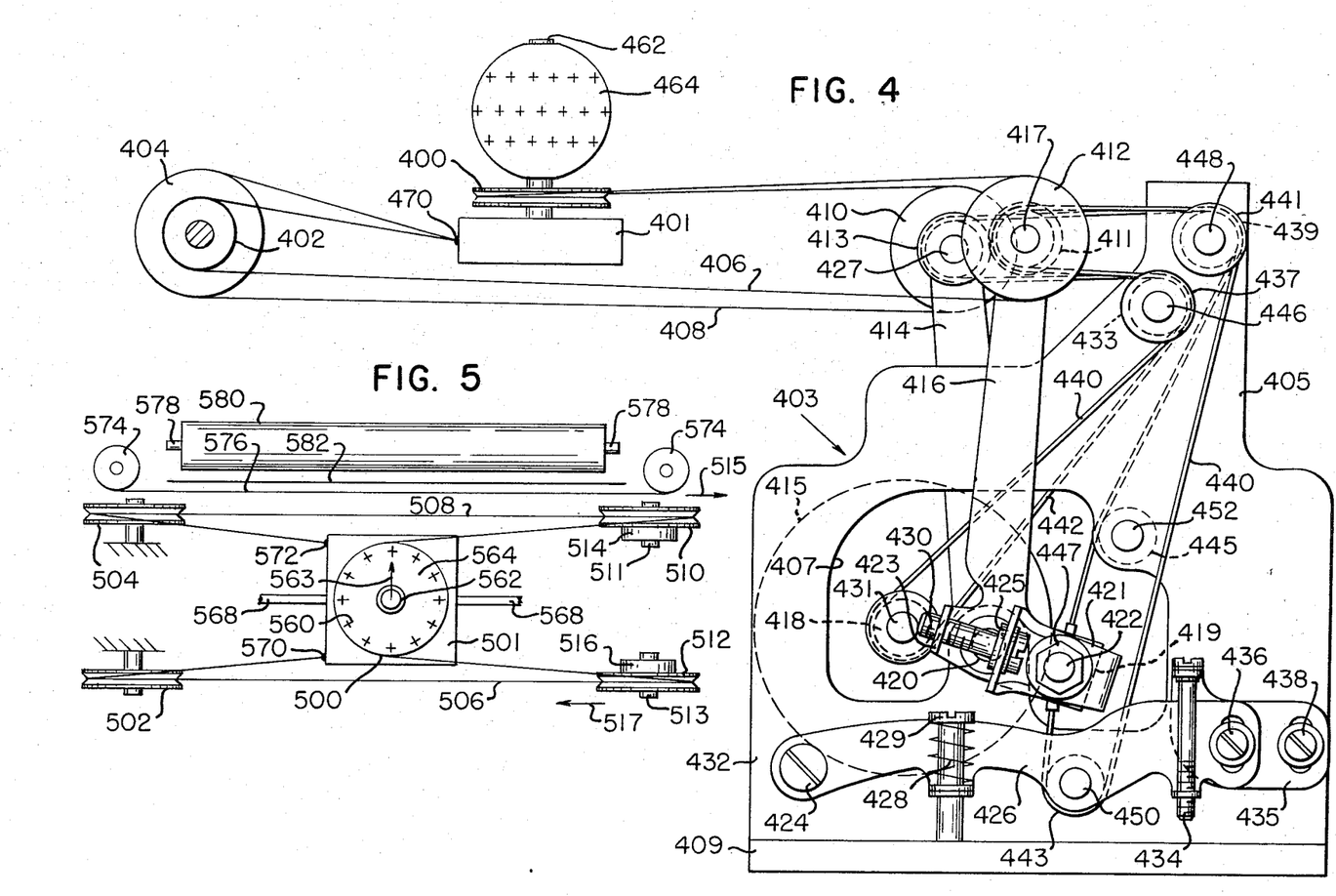
FIG. 4 of the drawings shows a coupling apparatus made in accordance with the present invention embodied as a source of rotational energy for a spherical printing ball in a movable carriage serial printer.
FIG. 5 of the drawings shows a top view of a second coupling apparatus which is made in accordance with the present invention and which is embodied into a spherical ball printing mechanism.

The movable anchor point 212 in FIG. 2 may be located on either side of the axis of rotation of shaft 202. The location of the movable anchor point 212 shown in FIG. 2 is such that the contemplated movement of lever arm 200 produces greater withdrawal of the flexible tension member 206 with respect to the pulley member 208 than if the anchor point 212 were fixed to a frame of the machine. If the anchor point were located at the point 228 in FIG. 2 on the opposite side of the rotation axis of shaft 202 the withdrawal of flexible tension member 206 with respect to the pulley member 208 would be lessened by rotation of control arm 200 rather than increased. In practice it is often convenient to provide a threaded adjustment apparatus, as shown in FIG. 4, or other means by which the location of anchor point 212 may be moved to a position on either side of the shaft 202 or to a point coincident with the axis of the shaft 202 in order that the coupling ratio between shafts 204 and 202 be completely variable over a band extending on both sides of a nominal coupling ratio.

The movable anchor point configuration of FIG. 2 allows the coupling ratio between shafts 202 and 204 to be varied over at least a small range and in a manner which is convenient and mechanically positive in nature. In contrast with the FIG. 1 apparatus, where altering the coupling ratio involves a multiple-step trial and error manipulation of slots or other adjustment structures, the FIG. 2 apparatus allows a simple and convenient adjustment of coupling ratio with a screwdriver or other tool, while also permitting all of the major structural parts of the coupling mechanisms to be fixed and nonadjustable in size and to have easily manufactured mechanical tolerances.

FIG. 3 of the drawing shows an embodiment of the present invention which incorporates two modifications distinguishing over the FIG. 2 embodiment. In FIG. 3 the flexible tension member 306 is engaged with the control arm lever member 300 by means of a pair of linear bearing guide members 308 and 310 which replace the pulley member 208 shown in FIG. 2. The linear bearing guide members 308 and 310 may be fabricated from any of the low friction materials including metals and nonmetallic substances such as bronze, babbit and teflon which are known in the art of bearing manufacture. The linear bearing guide members 308 and 310 illustrate that structures other than the pulley 208 may be employed at the point of engagement between a lever arm member and the flexible tension member in the present invention.

The second modification of the FIG. 2 apparatus which is shown in FIG. 3 involves replacement of the movable anchor point 212 with a fixed anchor point 316 together with incorporating an auxiliary member on the lever arm 300 to accomplish deflection of the flexible tension member 306 in response to rotational movement of the lever arm 300. Although use of an auxiliary member such as pulley 312 in FIG. 3 to merely deflect the flexible tension member 306 does not conveniently allow both positive and negative adjustment of the coupling ratio, as was true for the movable anchor point structures of FIG. 2, and is also less effective in altering the amount of flexible tension member withdrawn by the movable anchor point with respect to pulley member 308 (because of the rolling nature of the contact between pulley member 312 and flexible tension member 306 and because of the geometry surrounding engagement of these two elements), the FIG. 3 structure does provide the effect of a movable anchor point trajectory. The FIG. 3 structure also provides an anchor point trajectory having a different mathematical relationship with respect to the rotation of output shaft member 302 as compared with the movable anchor point shown in FIG. 2 and is therefore more useful in some embodiments of the invention. A spring return means shown as a spring 301 is used to effect counterclockwise rotation of the lever member 300 as was true with the embodiment shown in FIG. 2.

FIG. 4 shows the variable coupling ratio apparatus of the present invention embodied in a portion of a serial printer machine. The positive displacement variable coupling ratio apparatus of the present invention is especially well suited for use in overcoming the accumulative print-ball rotation error in typewriter and serial printer machines since many of the structural elements needed in the variable coupling ratio apparatus are already incorporated in the ball carriage-to-frame coupling portion of these machines. The present invention coupling apparatus may however be employed in any type of mechanical apparatus and is not limited to use in printing and typewriting machines.

In FIG. 4 of the drawings there is shown a serial printer machine portion which incorporates a variable coupling ratio apparatus of the type shown in FIG. 2. In FIG. 5 the essential components of the complete serial printer are shown as they would appear when viewed from above the machine while in FIG. 4 the components which are involved in performing the ball rotation function are shown in a frontal view. FIG. 4 and FIG. 5 taken together illustrate the manner in which a variable coupling ratio apparatus made in accordance with the present invention can be incorporated into cable-driven serial printing equipment.

At 564 in FIG. 5 there is shown a spherical or golfball printing element which is mounted on a rotatable shaft 562. On the surface of the spherical printing element is located a series of printable characters 560 which are organized into columns and rows. The spherical printing element 564 in FIG. 5 is mounted on a print-head 501 which is connected by a set of cable or band-like members 568 to a print head movement apparatus which is not shown. The print head 501 is slidably mounted on a plurality of laterally extending guide members which are also not shown in FIG. 5.

Adjacent to the print head 501 and spherical printing element 564 there is shown a printing ribbon 576 along with a pair of reel members 574 which dispense and collect the printing ribbon. Immediately behind the printing ribbon 576 in FIG. 5 is located the paper or media 582 to be imprinted by the FIG. 5 mechanism. To the rear of the paper 582 in FIG. 5 is located a platen 580 which is rotatably mounted by a shaft 578.

Also shown in FIG. 5 are several elements of the rotation mechanism for the spherical printing ball 564. These elements include two ball rotation cables 506 and 508 which may actually comprise a single continuous cable which begins and ends at the points 570 and 572 or which can alternately comprise two separate cables which each terminate at the points 570 and 572 and on the periphery of the pulley or cable drum 500 mounted on the shaft 562. The ball rotation cable 506 originates at the point 570 on the print head 501, is threaded around the fixed position pulley member 502 and thence travels laterally across the printer where it engages the bottom of pulley member 512. From the bottom of pulley 512 the cable 506 travels around the periphery of pulley 512 before leaving at the top and traveling toward the cable drum 500 mounted on the shaft 562. The cable 506 engages the cable drum 500 by way of friction or an actual connection to its structure. The cable 508 is similarly threaded from a starting point at 572 around the pulleys 504 and 510 and engages the cable drum 500. The pulleys 501 and 512 in FIG. 5 are each rotatably fastened to a pair of pivotally mounted control arm levers 514 and 516 by means of bearing stud members 511 and 513. The control arm levers 514 and 516 are shown only in a top view representation in FIG. 5; the means for driving the control arm levers 514 and 516 is not shown in FIG. 5.

During operation of the FIG. 5 printing mechanism the control arm levers 514 and 516 are moved differentially to the right and left in order that rotation of the shaft 562 and the spherical printing ball 564 be accomplished. Movement of the control arm lever 514 to the right together with movement of the control arm lever 516 to the left as indicated by the arrows 515 and 517 in FIG. 5 produces clockwise rotation of the shaft 562 and the spherical printing element 564.

When the control arm levers 514 and 516 are in the position shown in FIG. 5 wherein there is zero lateral differential displacement between their positions, the spherical printing element 564 is said to be located in its home position. This home position is indicated by vertical orientation of the reference arrow 563. During printing operations of the FIG. 5 mechanism it is contemplated that the spherical printing element 564 will be rotated by substantially 180° in both the clockwise and counterclockwise directions from this home position in order that each of the characters 560 on the printing element 564 be accessible in a printing position adjacent the paper 582 and ribbon 576. Bidirectional rotation over two separate 180° arcs tends to minimize accumulative rotation errors introduced by the cable and pulley coupling apparatus of FIG. 5 in comparison with that which would be experienced with a single 360° unidirectional rotation of the spherical printing element 564. Even with this error minimization however it is very difficult to achieve satisfactory character registration in a mechanism of the FIG. 5 type in the absence of some means for controlling tolerance and wear error that normally exist in the present variable coupling ratio apparatus.

During operation of the FIG. 5 apparatus, the print head 501 and the spherical printing element 564 are laterally positioned in the desired location along the width of the paper 576 by forces applied via the cable or band-like members 568. During this lateral positioning the print head moves along guide members which are not shown in FIG. 5. During or in sequence with this lateral positioning operation, the spherical printing element is both rotated around the axis of shaft 562 and tilted (by mechanism not shown) about a lateral axis which is not shown but which passes through the approximate center of the spherical printing element. Tilting of the spherical printing element about a lateral axis allows selection between the different rows of printable characters located on the spherical printing element. Both the mechanism used for tilting the spherical printing element 564 and the mechanism used for laterally positioning the print head 501 may be embodied to employ flexible tension members such as the cables or band members.

Even though the print head 501 in FIG. 5 is connected with the stationary frame of the printing mechanism by the ball tilt and the ball rotate cables (the latter being shown at 506 and 508 in FIG. 5) the lateral position of the print head is completely independent of these cables and is determined solely by forces applied via the cables 568. The ball tilt and ball rotate cables all move in unison while retaining their established differential relationship during lateral movement of the print head 501.

Once the spherical printing element 564 in FIG. 5 is correctly positioned for performing a print operation, the actual performance of the printing function is accomplished by canting or tipping the combined spherical printing element 564 and print head 501 structure about a second laterally disposed axis, which is not shown but is located below the spherical printing element 564, until the spherical printing element 564, the paper 582, and the platen 580 are brought into pressured contact.

The printing machine shown in FIG. 4 of the drawings is viewed from its front in a manner which is especially useful in describing the variable coupling ratio mechanism portion of the machine. Even though the FIG. 4 machine includes a different grouping of the serial printer elements and shows these elements located in a different physical position as compared with the FIG. 5 apparatus described above, a related set of numbers is employed for designating parts which are similar in FIG. 4 and FIG. 5. In accordance with this related set of numbers the print head in FIG. 4 is designated with the number 401 and the spherical printing element in FIG. 4 is designated with the number 464, which is mounted on a shaft 462. A pulley 400 is also mounted on the shaft 462, which is rotatably mounted in a print head member 401.

A first flexible tension member or cable 406 is connected between the pulley 400 and the print head member 401 in FIG. 4 by way of a first movable pulley 412 and a first fixed position pulley 402. The flexible tension member or cable 406 is anchored at one end to the print head member 401 at the point 470 in the manner described for the cable 506 in FIG. 5.

A second flexible tension member or cable 408 in FIG. 4 is also connected between the pulley 400 and the print head member 401. The second flexible tension or cable member also engages a second movable pulley 410 and a second fixed position pulley 404. The two fixed position pulleys 402 and 404 may have any convenient diameter including the same diameter; these pulleys are shown in FIG. 4 as having different diameters in order that the threading path of the cables 406 and 408 be individually distinguishable.

The movable pulleys 412 and 410 in FIG. 4 are mounted on control arm levers 416 and 414 which are part of the spherical printing element prime mover mechanism identified as 403 in FIG. 4. The spherical printing element prime mover mechanism is comprised of a backplate member 405 containing an aperture 407. The backplate 405 is mounted on a base structure 409 which in turn may be attached to a part of the printing machine frame which is not shown.

Several parts of the printer mechanism which are involved in the variable coupling ratio apparatus are attached to the backplate 405 in FIG. 4; these members include a stepping motor 415 which is attached to the rear side of the backplate and a plurality of bearing studs 420, 452, 446, and 448 with the bearing stud 452 of this group being mounted on the rear side of the backplate 405 and with the bearing stud 420 extending both to the front and rear sides of the backplate 405. Also connected to the backplate 405 in FIG. 4 are a pivot screw 424 and a pair of locking screws 436 and 438.

A lever arm member 426 is mounted on the pivot screw 424 in FIG. 4. This lever arm member is also engaged by the locking screw 436. Also contacting the lever arm 426 are an adjusting screw 429 and a tension spring 428. The lower end of the adjusting screw 429 is engaged with the base plate 409. The lever arm 426 is also engaged by a second adjusting screw 434 and a lever arm extension member 435. The lever arm extension member 435 is engaged by both the adjusting screw 434 and the locking screws 436 and 438. The locking screws 436 and 438 are mounted in the backplate 405 by means of threaded mounting holes or nuts which are not shown. Spacer elements not shown in FIG. 4 are located around the screws 424, 436 and 438 between the lever arm member 426 and the backplate 405 in order that operating clearance be afforded the pulley 443. A fifth bearing stud 450 is mounted on the lever arm member 426.

Pivotally mounted on the bearing stud 420 in FIG. 4 are the control arm levers 414 and 416 with the control arm lever 414 being mounted on the rear side of the backplate 405 and the control arm lever 416 being mounted on the front side of the backplate. The control arm lever 416 in FIG. 4 is comprised of an elongated arm portion having a bearing stud 417 attached near the outward extremity and having an angularly offset portion 419 attached near the inward extremity. Slidably mounted on the angularly offset portion 419 is a shoe member 421. This shoe member is also engaged by the adjustment screw 430 which connects with a turned-up portion 423 of the control arm lever 416. The adjustment screw 430 is retained captive in a turned up portion of the shoe member 421 by the retainer clip 425.

Mounted on the shoe member 421 and also engaging the control arm lever angularly offset portion 419 is a cable anchor point structure 422; this anchor point structure also incorporates a clamping apparatus including the threaded nut 447.

Independently rotatably mounted on the bearing stud 417 at the outer extremity of control arm lever 416 are a pair of pulley members 411 and 412, the pulley member 411 being smaller than the pulley 412 and being mounted behind the pulley 412 in FIG. 4.

Independently rotatably mounted on the bearing stud 427 which is located at the outer extremity of control arm lever 414 in FIG. 4 are another pair of pulley members 410 and 413. The center to center distance between bearing stud 420 and each of the bearing studs 417 and 427 is the same.

The stepping motor 415 in FIG. 4 is mounted on the rear side of the backplate 405 by means such as a plurality of clamps and screws which are not shown in FIG. 4. On the output shaft 431 of the stepping motor is located a drum member 418 which may contain a spiral groove capable of receiving flexible tension member cables.

Each of the bearing studs 446 and 448 has rotatably mounted thereon a pair of independently rotatable pulley members with the bearing stud 446 having the pulley 433 mounted in front of the backplate 405 and the pulley 437 mounted behind the backplate and the bearing stud 448 having the pulley 439 mounted in front of the backplate 405 and the pulley 441 mounted behind the backplate. The bearing studs 450 and 452 each have a single rotatable pulley 443 and 445 respectively mounted thereon.

The first and second flexible tension members or cables 406 and 408 are connected between the pulley 400 on the spherical printing element shaft 462 and the pulleys 410 and 412 located at the outer extremities of the control arm levers 414 and 416. A third flexible tension member or cable 440 is threaded from the clockwise playing out side of the stepping motor drum member 418 around the pulley 411 on the control arm lever 416 and thence to the cable anchor point structure 422. The third cable also passes over the pulleys 437, 441 and 443 at intermediate points between the drum member 418 and the cable anchor point structure 422.

A fourth flexible tension member or cable 442 is threaded from the clockwise reeling in side of the stepping motor drum member 418 around the pulley 413 on the control arm lever 414 and thence to the cable anchor point structure 422 on the angularly offset portion 419. The fourth flexible tension member or cable 442 is threaded around the pulleys 433, 439 and 445 at points intermediate the drum member 418 and the cable anchor point structure 422. As illustrated in FIG. 4 the flexible tension member 442 and each of the pulleys which it is threaded around lie in a plane located to the rear of backplate 405 while the flexible tension member 440 and each of the pulleys which it is threaded around are located in a plane passing in front of the backplate 405 but behind the lever arm member 426. Space between the lever arm member 426 and the backplate 405 is provided by the aforementioned spacer elements, not shown, which can be located around the screws 424, 436 and 438.

Connection of the flexible tension members or cables 440 and 442 to the cable anchor point structure 422 in FIG. 4 compensates for dimensional variations in the elements which are critical to the coupling ratio between shafts 431 and 462 in the manner described for FIG. 2 and FIG. 3 in the drawings. In the FIG. 4 mechanism, for instance, it is found that diameter of the pulley 400, diameter of the drum member 418 and diameter of the flexible tension members or cables 440, 442, 406 and 408 are dimensions of first concern in attaining and keeping the desired coupling ratio. The manner in which dimensional changes in these elements influence the coupling ratio between shafts 431 and 462 and the manner in which a movable anchor point structure compensates for these dimensional changes can be understood by considering that in essence the tendency of these tolerances is to position the shaft 462 at points which are increasingly in excess of (or short of) the desired rotation point as movement farther and farther toward the end of rotation of the shaft 462 occurs. According to the increasing error, or run out error, for example a character located one half way along rotation of the spherical printing element might be misregistered by 1° of rotation while a character located three-fourths of the way along the rotation would be misregistered by 1½° and a character located at the end of rotation would be misregistered by 2°. Since both the cables 440 and 442 are connected to the cable anchor point structure 422, movement of this anchor point structure in a direction lengthwise of the cables 440 and 442 (assuming for the moment that the cable anchor point structure 422 is floating and not connected to the control arm lever 416) will produce differential movement of the control arm levers 414 and 416 and rotation of the shaft 462. This rotation of the shaft 462 as a result of moving the cable anchor point structure 422 can be employed to correct for the run out error if the correct amount and direction of movement is provided by the cable anchor point structure 422. The correct amount of movement for the cable anchor point structure 422 is of course proportional to the rotational distance through which the shaft 462 and hence the control arm lever 416 have passed since leaving the neutral position (which corresponds with the home position of the spherical printing element 464). In the FIG. 4 mechanism, the precise amount of movement required of the cable anchor point structure 422 is achieved by connecting the cable anchor point structure 422 with the control arm lever 416, this connection being conveniently accomplished by adding the angularly offset portion 419 to the control arm lever 416. The adjustment screw 430 in FIG. 4 permits the amount of movement of the cable anchor point structure 422 with respect to rotational movement of the control arm lever 416 to be adjusted.

During operation of the spherical printing element prime mover 403, retraction of cable 442 causes control arm lever 414 to rotate in a clockwise direction about the bearing stud 420 and produces a tension force in the cable 408. Tension in cable 408 causes the pulley 400, shaft 462 and spherical printing ball 464 to rotate in a clockwise direction as viewed from above.

Clockwise rotation of the pulley 400 produces tension forces in the cable 406 which are in turn transmitted by way of the pulley 412 to the control arm lever 416 where counterclockwise rotation about the bearing stud 420 results. Counterclockwise rotation of the control arm lever 416 causes the pulley 412 to move toward the left in FIG. 4 and to thereby collect the part of cable 440 which is played out by the clockwise rotation of drum 418.

As a result of the motor shaft 431 rotating in the clockwise direction in FIG. 4, the control arm lever 414 is moved in the clockwise rotation direction while the control arm lever 416 is moved in the counterclockwise rotation direction; this opposite motion by the control arm levers or other elements of the machine is called differential movement for the sake of brevity. With the threading of cables 406, 408, 440 and 442 described in FIG. 4, clockwise rotation of the motor shaft 431 as viewed from the front produces clockwise rotation of the spherical printing element 464 as viewed from the top. Alternate threading arrangements which modify either the clockwise to clockwise correspondence between shafts 431 and 462 or individual movement in the differential motion of control arm levers 414 and 416 are readily obtained by alternate threadings of the cables in FIG. 4.

In combination the angularly offset portion 419, the shoe member 421, the adjustment screw 430, the turned up portion 423 of the control arm lever 416 and the cable anchor point structure 422 allow location of the cable anchor point structure 422 to be precisely selected with respect to the rotational axis of control arm lever 416. Precise selection of the anchor point location allows the coupling ratio between shafts 431 and 462 to be determined with a high degree of precision as has been described in connection with FIGS. 2 and 3 above.

In setting up the FIG. 4 apparatus, the actual location of cable anchor point structure 422 is selected by rotating the adjusting screw 430. Once the desired anchor point location is found, the threaded nut 447 or its counterpart, not shown, on the rear side of the angularly offset portion 419, is tightened in order that the shoe member 421 and the angularly offset portion 419 shall be locked together and the location of the cable anchor point structure 422 be permanently fixed.

Each of the bearing stud mounted pulleys 433, 437, 439, 441, 445, and 450 is incorporated into the FIG. 4 mechanism in order that the flexible tension members 440 and 442 be diverted into a desired alignment with respect to some other element of the mechanism. The pulleys 433, 437, 439 and 441 are provided in order that the flexible tension members or cable members 440 and 442 approach the control arm lever pulleys 411 and 413 along a path which is substantially tangent to the path of movement of the pulleys 411 and 413. The pulleys 445 and 450 are also incorporated into the FIG. 4 mechanism for the purpose of aligning the flexible tension members or cable members 440 and 442 along paths which are tangent to the path of movement of the anchor point 422. Alignments other than this tangent to the path of movement could be used for the flexible tension members or cables 440 and 442 at either the anchor point or the pulleys 410, 411, 412 and 413; however, any other alignment reduces the effectiveness of the movable anchor point structure in altering the coupling ratio between the FIG. 4 shafts 431 and 462.

The pulley 443 which is mounted on the bearing stud 450 on the lever arm 426 in FIG. 4, in addition to aligning the flexible tension member 440 along a path substantially coincident with that of flexible tension member 442 and tangent to the path of motion of the cable anchor point structure 422 also allows the removal of cable slack and the establishment of static tension force in the flexible tension members or cable members 440, 442, 406 and 408. The spring 428 in FIG. 4 serves to keep a small bias tension on the cables 440, 442, 406 and 408. When the locking screws 436 and 438 are released, this bias tension is sufficient to hold the cables engaged with the respective pulley members and thereby eliminate the possibility of cable unthreading and entanglement.

Once an approximately correct position for the lever 426 is determined, the locking screw 438 can be tightened and a final high resolution position adjustment for the lever arm and the pulley 443 made by way of the adjustment screw 434. Following this high resolution position adjustment, the locking screw 436 can be tightened to maintain the lever arm 426 in the selected position. A graduated scale can be included on the lever arm 426 or the lever arm extension member 435 in order that successive positions of the lever arm be identifiable. The movable nature of the bearing stud 450 and the pulley 443 also allows tension in the cables to be adjusted following long term use of the FIG. 4 mechanism or following alteration of the anchor point location with the adjusting screw 430 if the geometry selected for the movable anchor point and the approach of the flexible tension members to this anchor point necessitates such adjustment.

In the FIG. 4 embodiment of the variable coupling ratio apparatus, each of the pulley members located on a particular control arm is mounted on a common bearing stud. The pulleys 411 and 412 in FIG. 4 which respectively receive energy from the stepping motor 415 and transmit energy to the ball structure are both located on the bearing stud 417. In other embodiments of the variable coupling ratio apparatus the two pulleys 411 and 412 can be mounted at separate locations on the control arm levers in order that a multiplication of force or velocity occur.

In lieu of the stepping motor 415 in FIG. 4 it is of course possible to employ a mechanical adder or some other form of prime mover apparatus in other embodiments of a variable coupling ratio or a serial printer apparatus.

In mechanisms which are to employ the variable coupling ratio apparatus of the present invention, it is frequently convenient to select the dimension of one or more elements which is critical in determining the coupling ratio between input and output shafts to be intentionally smaller or larger than the correct or ideal size for such element. With this selection the coupling ratio achieved with the uncorrected mechanism will be smaller or larger than the desired coupling ratio. Once this smaller or larger than desired coupling ratio is embodied into a mechanism, it is possible to employ a movable anchor point structure capable of only increasing or only decreasing the coupling ratio in order to correct the attained coupling ratio to the desired value. As can be appreciated by inspecting the parts around the cable anchor point structure 422 in FIG. 4, the fabrication of a movable anchor point structure which is capable of locating the anchor point on only one side of the bearing stud 420 is often more convenient than is fabrication of a structure which would permit the anchor point to be located on either side of the bearing stud.

It will be obvious from an inspection of the FIG. 2, FIG. 3 and FIG. 4 embodiments of the variable coupling ratio apparatus that the differential movement of the control arm levers 414 and 416 could in itself be utilized as an output of the variable coupling ratio apparatus either with or without the incorporation of a single output shaft member such as the shaft 462 in FIG. 4. This differential movement could for instance be coupled from the control arm levers of FIG. 4 by altering the structure of the control arm levers at their point of engagement with the bearing stud 420 so that an output shaft member is rigidly attached to each control arm lever. The two output shaft members would then rotate in bearings which are mounted in the backplate member 405 and would provide the output of the apparatus. The differential movement of the control arm levers 414 and 416 may be usable in some applications in its differential form or can be applied to a geared differential apparatus of the type which is known in the art and which is embodied into an automobile axle in order that a single shaft output be obtained.

While the forms of the rotational shaft coupling apparatus with adjustable coupling ratio and positive displacement constitute particular embodiments of the invention herein described, it is to be understood that the invention is not limited to these precise forms and that changes may be made therein without departing from the scope and spirit of the invention.

What is claimed is:

1. Adjustable coupling ratio positive displacement apparatus for transmitting limited rotational movement of a first rotatable shaft member to a second rotatable shaft member, said apparatus comprising:

first lever arm means mounted on said second rotatable shaft member to rotate therewith;

first receiving and diverting means mounted on said first lever arm means at a point displaced from the rotational axis of said second rotatable shaft member for receiving force from and diverting the path of a flexible tension member and for enabling lengthwise movement of said flexible tension member past said point;

a first flexible tension member engaging both said first rotatable shaft member and said first receiving and diverting means, said first flexible tension member being played out and retracted by said first rotatable shaft member at one end thereof and being connected to an anchor point at the second end thereof;

tension member displacing means cooperating with said first lever arm means and located between said second rotatable shaft member and said first receiving and diverting means for altering the length of said first flexible tension member existing between said first receiving and diverting means and said anchor point in response to rotation of said first lever arm means.

2. Adjustable coupling ratio positive displacement apparatus as in claim 1 wherein said tension member displacing means includes an arm member extending from said first lever arm means near said second rotatable shaft member and having said anchor point located on the free end of said arm member along a radial line from said rotational axis.

3. Adjustable coupling ratio positive displacement apparatus as in claim 2 further including a guide member means to enable said flexible tension member to approach said anchor point at an angle of substantially 90° with respect to a radial line joining said rotational axis of said second rotatable shaft member and said anchor point.

4. Adjustable coupling ratio postiive displacement apparatus as in claim 1 wherein said tension member displacing means includes adjusting means for selectably moving the location of said anchor point with respect to the rotational axis of said second shaft member.

5. Adjustable coupling ratio positive displacement apparatus as in claim 1 wherein said first receiving and diverting means comprises a rotatable sheave member.

6. Adjustable coupling ratio positive displacement apparatus as in claim 1 wherein said first receiving and diverting means includes a curved guide member slidably engaging said first flexible tension member.

7. Adjustable coupling ratio positive displacement apparatus as in claim 1 wherein said apparatus also includes return means for rotating said first lever arm means and said second rotatable shaft member about said rotational axis of said second shaft member in a direction opposite to that induced by said first flexible tension member.

8. In combination with a printing mechanism of the type having a printing ball member whose rotation is controlled independently of a lateral movement of the printing ball member, an improved printing ball member rotation apparatus comprising:

a first shaft member mechanically connected with said printing ball member for rotationally driving said printing ball member;

a driving drum member and means for reversibly rotating said driving drum member;

a supporting stud having a longitudinal axis;

a pair of control arm members each having one end pivotally mounted on said supporting stud, and said control arm member being located intermediate said first shaft member and said driving drum member in said apparatus;

first cable member means drivingly connecting said first shaft member with the remaining ends of both of said control arm members for rotating said first shaft member in response to a differential pivoting movement of said control arm members and for holding said first shaft member rotationally stationary during lateral movement of said first shaft member;

one of said control arm members having an angularly offset member means extending from its said one end to provide an anchor point which is radially displaced from said longitudinal axis; and second cable member means drivingly connecting said driving drum member with said remaining ends of said control arm members for differentially pivoting said control arm members in response to a rotational movement of said driving drum member, said second cable member means including a cable member drivingly connecting said remaining ends of said control arm members and said driving drum member and whose ends are connected to opposed sides of said angularly offset member means at said anchor point.

9. The improved printing ball member rotation apparatus of claim 8 wherein said second cable member means includes means for aligning the ends of said cable member into paths which approach said anchor point from directions substantially perpendicular to a line joining said anchor point with said longitudinal axis.

10. The improved printing ball member rotation apparatus of claim 8 wherein each of said control arm members are rotatably mounted on said control arm members has rotatably mounted on said remaining end pulley members which engage said first and second cable member means.

11. The improved printing ball member rotation apparatus of claim 8 wherein said offset member means includes:

means for adjustably fixing the location of said anchor point along a radial line from said longitudinal axis.

12. The improved printing ball member rotation apparatus of claim 11 wherein said second cable member means includes means for adjustably applying a static tension force to said cable member for removing slack therein.

* * * * *

UNITED STATES PATENT OFFICE
CERTIFICATE OF CORRECTION

Patent No. 3,861,511                Dated January 21, 1975

Inventor(s) Carl R. Nelson et al.

It is certified that error appears in the above-identified patent and that said Letters Patent are hereby corrected as shown below:

Column 17, line 16, delete "members are rotatably mounted on said control arm".

Signed and sealed this 10th day of June 1975.

(SEAL)
Attest:

RUTH C. MASON
Attesting Officer

C. MARSHALL DANN
Commissioner of Patents
and Trademarks